Dec. 26, 1961 R. J. BARBER ET AL 3,014,521
APPARATUS FOR BUILDING PNEUMATIC TYRES
Filed Jan. 6, 1959 5 Sheets-Sheet 1

INVENTORS
Ronald Jesse Barber
John Fairburn Askham
by Benj. T. Rauber
their attorney Dec. 26, 1961   R. J. BARBER ET AL   3,014,521
APPARATUS FOR BUILDING PNEUMATIC TYRES
Filed Jan. 6, 1959   5 Sheets-Sheet 2
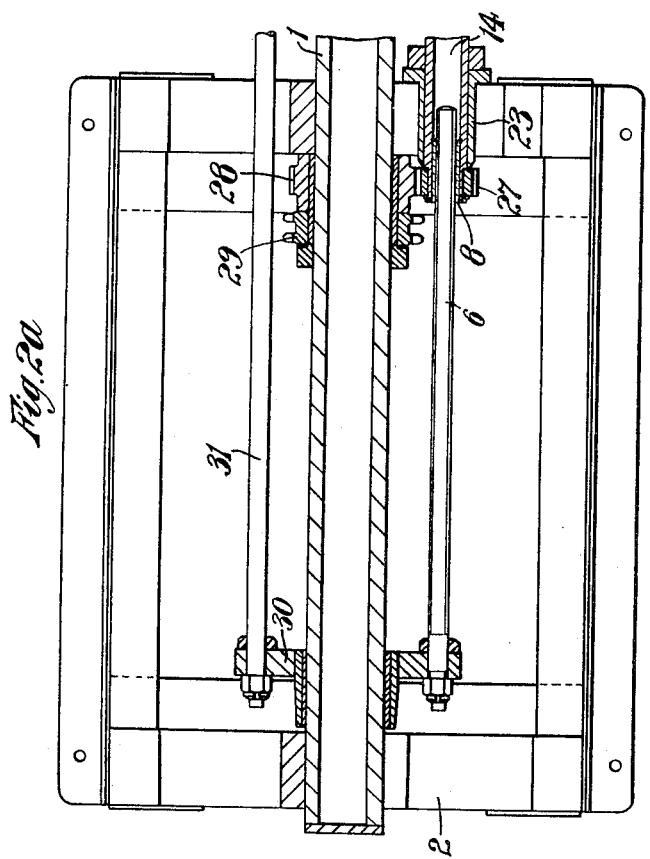
INVENTORS
Ronald Jesse Barber
John Fairburn Askam
by Benj. T. Pauba
their attorney

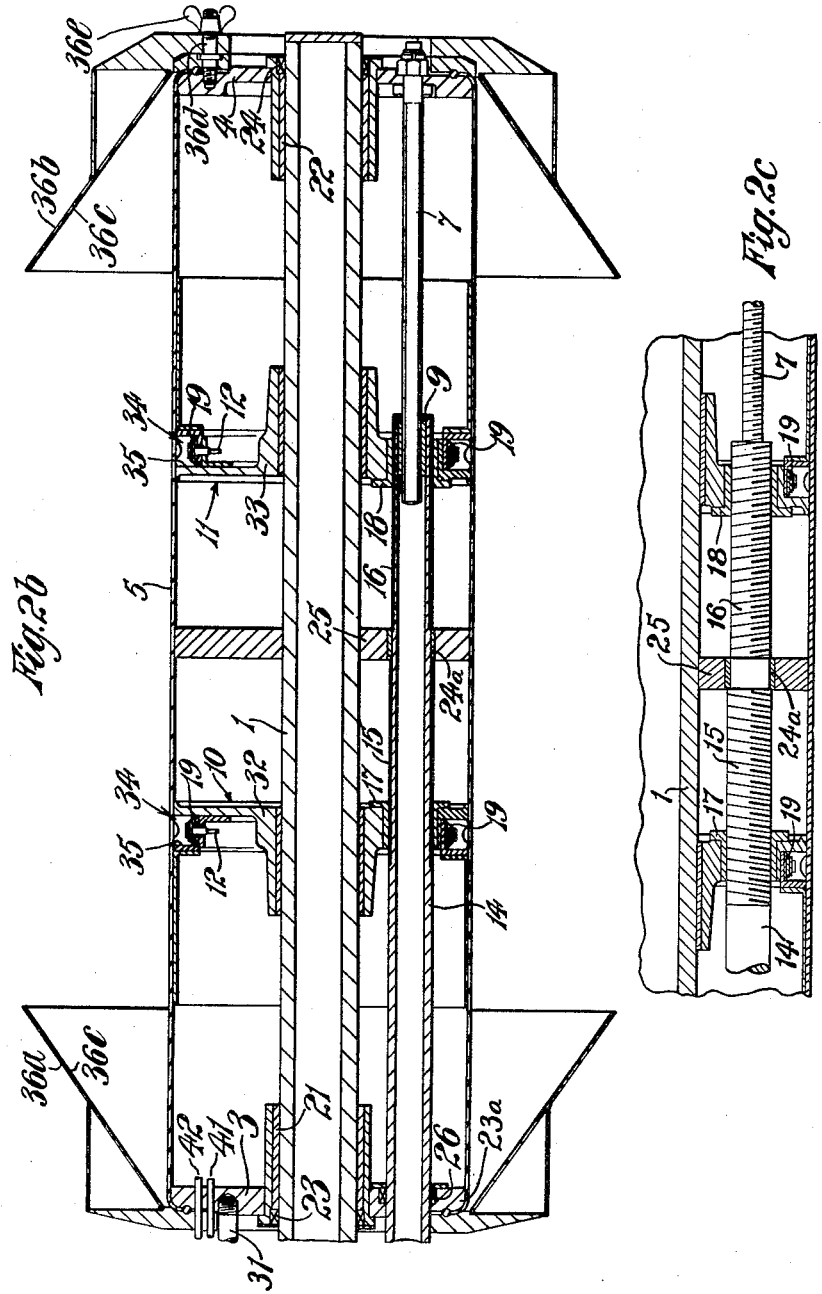

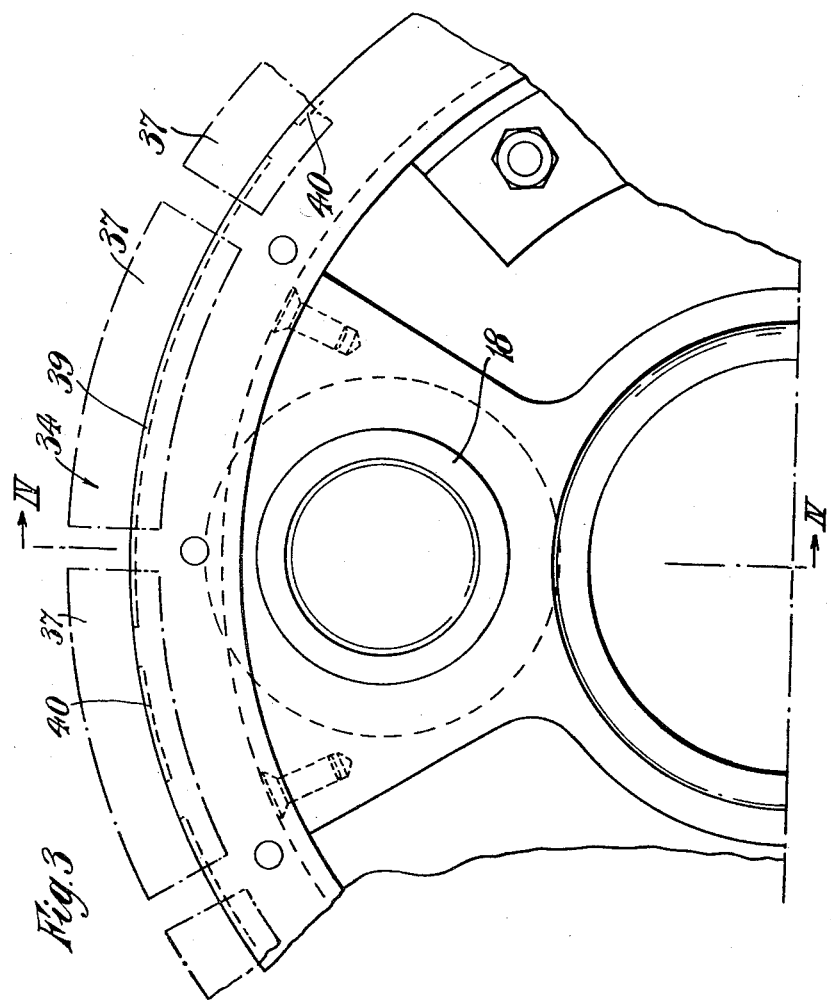

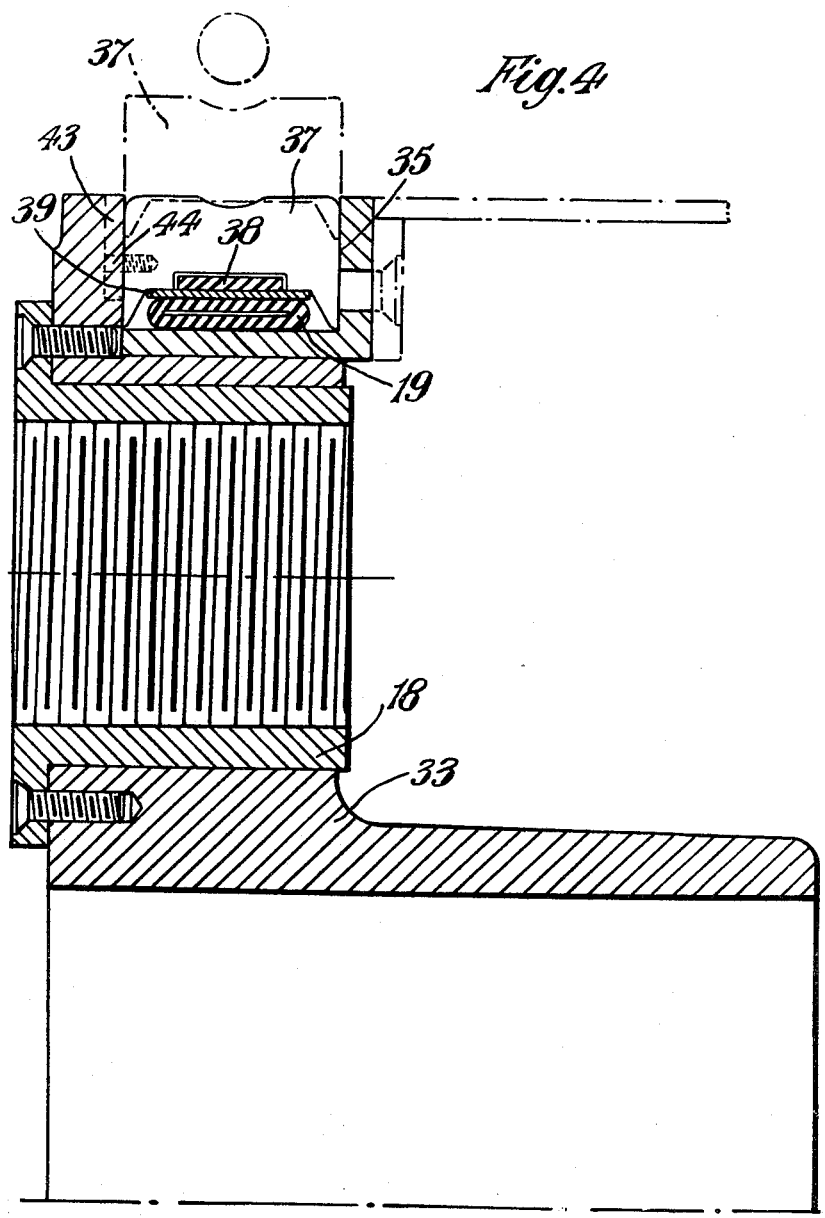

United States Patent Office 3,014,521
Patented Dec. 26, 1961

3,014,521
APPARATUS FOR BUILDING PNEUMATIC TYRES
Ronald Jesse Barber, Erdington, Birmingham, and John Fairburn Askam, Sutton Coldfield, England, assignors to Dunlop Rubber Company Limited, London County, England, a British company
Filed Jan. 6, 1959, Ser. No. 785,247
Claims priority, application Great Britain Jan. 15, 1958
6 Claims. (Cl. 156—401)

The invention relates to a method and apparatus for building pneumatic tyres.

It is an object of the present invention to provide an improved method and apparatus for building pneumatic tyres.

According to the invention a method of manufacturing pneumatic tyres comprises wrapping carcass building fabric around the external building surface of a substantially cylindrical inflatable radially-expansible diaphragm, the diaphragm being supported at its ends by supporting members, the whole width of the fabric being supported on the diaphragm, locating bead wires in spaced-apart relationship in a position inwardly of the edges of the fabric, securing the bead wires in position relative to the fabric, moving the diaphragm supporting members together, moving the bead wires together, and inflating the diaphragm so as to shape the portion of the fabric located between the bead wires and to turn up the edges of the fabric around the bead wires.

Preferably the movement together of both the bead wires and the diaphragm supporting members and the inflation of the diaphragm all take place simultaneously.

According to the invention also apparatus for the manufacture of pneumatic tyres comprises a substantially cylindrical inflatable radially-expansible diaphragm having an external building surface for supporting the whole of the width of carcass building fabric laid thereon including portions at each edge for turning up around bead wires, a pair of diaphragm supporting members one attached to each end of the diaphragm, a pair of members spaced-apart within the diaphragm for gripping the inner periphery of a pair of spaced-apart bead wires located on the said building fabric, means for moving the gripping members and diaphragm supporting members together and apart and means for inflating the diaphragm.

The bead wire gripping members may each comprise a segmented annulus supported on an inflatable annular tube, each tube being mounted on an annular support. Deflector rings may be provided, one at each end of the diaphragm, for deflecting the portions of the diaphragm axially inwardly thereof to assist in the turn-up operation.

The invention also comprises a pneumatic tyre manufactured either by the method or by the use of the apparatus as defined-above.

One embodiment of a tyre-building apparatus in accordance with the invention will now be described, with reference to the accompanying drawings, in which:

FIGURES 2a and 2b are two halves of a plan view of the machine shown in FIGURE 1, each showing partial vertical and horizontal cross-sections as indicated by the line II—II in FIGURE 1;

FIG. 2c is a section of a detail of the machine;

FIGURE 3 is an end view of a portion of a bead-gripping member;

FIGURE 4 is a cross-section of the bead-gripping member, taken on the line IV—IV of FIGURE 3.

Figure 1:
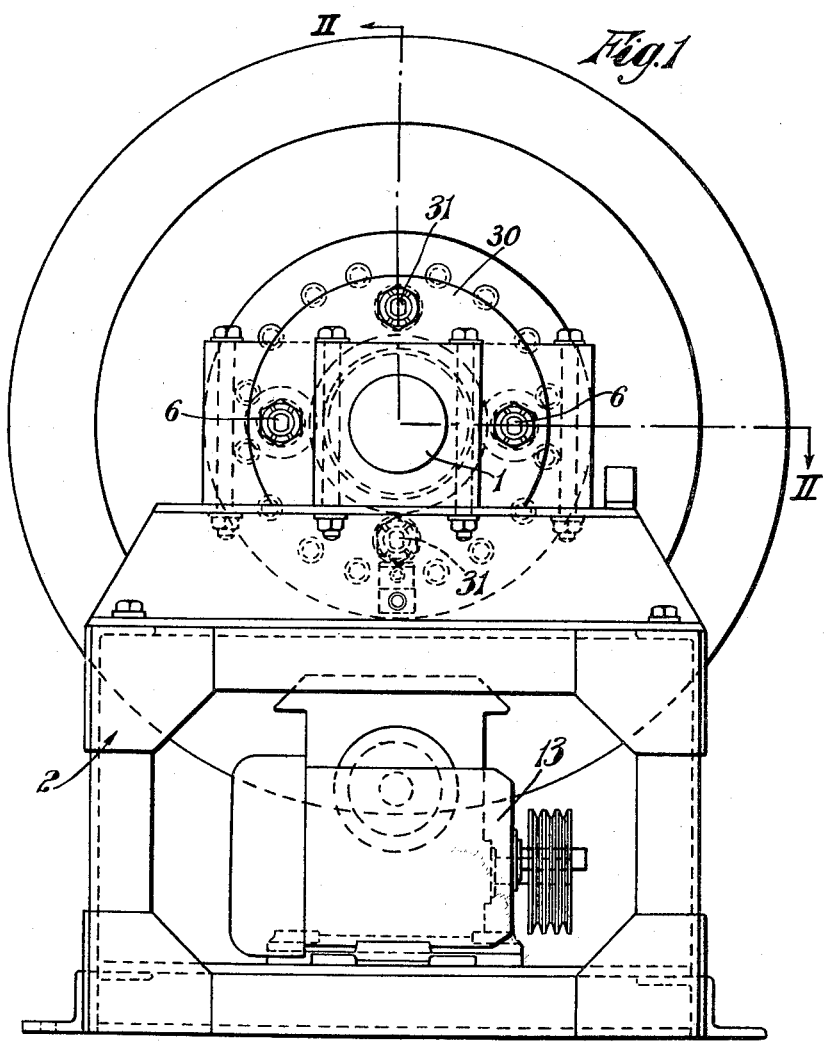
FIGURE 1 is an end elevation of a tyre building machine.

The apparatus shown in FIGURES 1 and 2 comprises essentially the following features. A main supporting shaft 1 is rigidly carried adjacent to one end in a horizontal position by means of a supporting framework 2. A pair of diaphragm supporting plates 3 and 4 are coaxially attached one to each end of an inflatable cylindrical tyre-building diaphragm 5, made of rubber and capable of radial expansion, and the supporting plates are slidable towards and away from each other on the main shaft 1 by means of pairs of screw-threaded rods 6, 7 and associated screw-threaded inserts 8 and 9, respectively, attached internally to a pair of tubes 14. A pair of bead wire gripping members 10 and 11 is provided, each of the members being slidably mounted on the main shaft 1 inside the cylindrical diaphragm 5. The gripping members 10 and 11 are moveable together or apart by rotation of the tubes 14 which each carry oppositely screw-threaded external portions 15 and 16 in engagement with correspondingly screw-threaded bushes 17 and 18 in the members 10 and 11. The bead wire gripping members carry annular rubber tubes 19, which are inflatable to grip bead wires mounted on the diaphragm, and the diaphragm is inflatable so as to shape tyre building fabric mounted thereon and to turn the edges of the fabric around the bead wires.

The apparatus will now be more particularly described.

The main shaft 1 has diaphragm supporting members in the form of a pair of annular plates 3 and 4 carried on the shaft by means of sleeves 21 and 22 which are attached to the plates and axially slidable relative to the main shaft. Air seals 23 and 24 are located at the outer ends of the sleeves 21 and 22 for sealing the gap between the sleeves and the main shaft 1 to prevent leakage of air upon inflation of the diaphragm.

The rubber diaphragm 5 extends between the supporting plates and the ends of the diaphragm are securely clamped air-tightly to the plates 3 and 4 adjacent to their outer peripheries. The diaphragm is inflatable through a pipe 41 passing through the plate 3.

Movement together and apart of the diaphragm supporting plates 3 and 4 is effected by the following mechanism. A pair of tubes 14 is mounted with the tubes in parallel relationship, one on either side of the main shaft. Each tube 14 is rotatably carried in a bearing 23a mounted on the supporting framework and a bearing 24a symmetrically mounted between the supporting plates, supported in offset relationship to the main shaft 1 in an annular member 25 fixed to the shaft. The tube 14 projects through the diaphragm supporting plate 3 and an air seal 26, within which the tube is rotatable, is provided. Each tube 14 has a pinion 27 attached to its end which is carried in the bearing 23 and this pinion meshes with a gear wheel 28, freely rotatably mounted on the main shaft 1, which is drivably connected to a sprocket wheel 29, driven through a conventional transmission by an electric motor 13. Each tube 14 is provided internally, at its end adjacent to the bearing 26, with a cylindrical insert 8 having an internal left-hand thread. The rod 6 is screw-threaded with a left-hand thread which engages the thread of the insert 8, the rod 6 forming a coaxial extension to one end of the tube 14. Each of the tubes 14 has a rod 6 and the rods are attached to diametrically-opposite points adjacent to the outer periphery of an annular plate 30 slidably mounted on the main shaft. Actuating shafts 31 are attached to diametrically opposite points on the annular plate 30, and at 90° intervals with respect to the rods 6. The actuating shafts 31 extend parallel to the screw-threaded rods 6 and are attached at their other ends to the diaphragm supporting plate 3.

Cylindrical inserts 9, having right-hand threads, are attached one to each of the other ends of the tubes 14, the inserts 9 each carrying one end of one of a pair of rods 7 provided with a right-hand screw thread. The other ends of these rods are rigidly attached to the diaphragm supporting plate 4.

Rotation of the tubes 14 causes either a movement together or a movement apart of the diaphragm supporting plates 3 and 4, the direction of movement depending upon the direction of rotation of the tubes 14. For example, in the former instance, rotation of the tubes 14 causes the screw-threaded inserts 9 at each end to draw the pairs of screw-threaded rods 6 and 7 inwardly into the hollow interiors of the tubes. The rods 6 draw the annular plate 30 along the main shaft so that the actuating shafts 31 move the diaphragm supporting plate 3 axially inwardly and a similar simultaneously axially inward movement takes place in connection with the diaphragm supporting plate 4 which is directly connected to the right-hand screw-threaded rods 7.

The bead wire gripping members 10 and 11 comprise annular supports 32 and 33 slidably mounted on the main shaft 1, and positioned symmetrically one on either side of the plane of symmetry of the diaphragm. The annular supports 32 and 33 are of substantially the same external diameter as the internal diameter of the cylindrical diaphragm 5 when this is uninflated. An annular rubber tube 19, inflatable via a pipe 12, which is connected through a pipe 42 (shown broken near supporting plate 3) to a source of air pressure, is surrounded by a segmented annulus 34 comprising rigid segments 37 for expanding radially outwardly to grip a bead wire, and is located in a recess 35 on the outer periphery of each of the supports 32 and 33. The segments 37 are shown in the expanded state in FIGURE 3 and in both the expanded and collapsed states in FIGURE 4, the expanded state of the segments being shown by chain-dotted lines in FIGURE 4. The segments 37 are normally pulled radially inwardly by a rubber band 38 extending around the whole periphery of the annulus 34 and held in position within the segments by metal plates 39 and 40 fixed to the segments. The plates 39 are attached to alternate segments 37, and extend between the segments to cover the gaps which are formed on expansion of the annulus 34 to prevent the tube 19 from bulging through the said gaps. The ends of the plates 39 are free to slide within the segments, adjacent to those to which they are attached, provided with plates 40 to retain the rubber band 38. Radial keyways 43 are provided in the sides of the recess 35 and are engaged by keys 44 on the segments, thus retaining the segments in fixed angular positions whilst permitting radial movement thereof. The diametrically opposite tubes 14 pass through the annular supports 32 and 33, the annular support 32 having a left-hand internally screw-threaded bush 17 in engagement with a left-hand screw-thread 15 formed externally on the tube 14, and the annular support 33 having a right-hand internally screw-threaded bush 18 in engagement with a right-hand screw-thread 16 formed externally on the tube 14. These screw-threads 15 and 16 and the screw-threads in the bushes 17 and 18 are of half the pitch of the screw-threads on the rods 6 and 7 and in the cylindrical inserts 8 and 9, used for moving the diaphragm supporting plates.

When the tubes 14 are rotated to move the diaphragm supporting plates 3 and 4 together from their outward position, in the manner earlier described, the bead wire gripping members 10 and 11 are simultaneously moved together from their outward position by means of the bushes 17 and 18 and associated screw-threads 15 and 16, the displacement of the bead wire gripping members being half that of the diaphragm supporting plates for any given number of rotations of the tube 14.

Deflector rings 36a and 36b are provided, one at each end of the diaphragm, and are secured to the supporting plates, the deflector rings each having a radially outwardly flared annular surface 36c inclined towards the plane of symmetry of the diaphragm at an angle of about 60° to the axis of the main shaft. The deflector ring 36b is detachably secured to the diaphragm supporting plate 4 by means of studs 36d and wing nuts 36e.

Bead-setting rings (not illustrated) are provided and are traversible axially of the main shaft so as to locate bead wire assemblies in appropriate positions relative to tyre building materials assembled on the diaphragm.

Means are also provided for locating a tread moulding ring, having a tread and breaker located therein, symmetrically in position relative to the diaphragm so that the carcass built on the diaphragm may be inflated into the tread and breaker carried in the ring. This method forms the subject of copending application of Barber and Lowe, Serial No. 782,728, filed December 24, 1958.

The operation of the apparatus just described will now be outlined. Tyre building materials to form a tyre carcass, together with rubber sidewalls, are assembled on the outer peripheral surface of the diaphragm 5 with the diaphragm in the uninflated cylindrical state and with the diaphgram supporting plates 3 and 4 and the bead wire gripping members 10 and 11 in their axially outermost position as shown in FIGURES 2a and 2b. At the appropriate stage in the building operation, bead wire assemblies, carried by the bead-setting rings, are located in a position co-axially with the diaphragm and radially in a position one over each of the bead wire gripping members with the portions of the tyre-building materials to be turned round the bead wire assemblies extending axially outwardly thereof. The annular tubes 19 carrying the segmented annuli 34 are then inflated so as to secure the bead wire assemblies in position relative to the tyre-building materials. The tread moulding ring, carrying a tread and breaker, is then accurately located symmetrically in position relative to the diaphragm and carcass built thereon.

The tubes 14 are now rotated so as simultaneously to move the diaphragm supporting plates and the bead wire gripping members 10 and 11 carrying the bead wires, axially inwardly and, at the same time, the diaphragm 5 is inflated. This operation shapes the portion of the tyre building materials located between the bead wire assemblies by arching of the diaphragm. At the same time the portions of the diaphragm axially outwardly of the bead wires are inflated and arched. The diaphragm thus assumes a shape made up of three annular corrugations, the central hump of the three corrugations shaping the carcass and the humps on each side thereof turning up the portions of the tyre-building materials extending axially outwardly of the bead wires. During the inflation of the diaphragm to form the outer humps, the diaphragm is pressed against the deflector rings 36 which deflect the humps axially inwardly so that the tyre building materials are not only turned up but pressed against the side wall portions of the carcass carried by the central hump. Moreover, during inflation of the diaphragm, the crowned portion of the carcass is pressed accurately and firmly in position against the breaker and tread carried by the tread moulding ring. Thus the carcass is shaped and the tyre-building materials are turned-up around the bead wire assemblies.

Deflation of the diaphragm 5 and the annular tubes 19 and movement of the diaphragm supporting plates 3 and 4 and annular supports 32 and 33 into their outermost positions enables the formed cover to be slid axially relative to the diaphragm, and removal of the deflector ring remote from the supporting framework allows removal of the formed cover from the diaphragm.

Having now described our invention what we claim is:

1. Apparatus for the manufacture of pneumatic tyres comprising a substantially cylindrical inflatable radially-expansible diaphragm having an external building surface for supporting the whole of the width of carcass building fabric laid thereon including portions at each edge for turning up around bead wires, a pair of diaphragm supporting members one attached to each end of the diaphragm, a pair of members spaced-apart within the diaphragm for gripping the inner periphery of a pair of spaced-apart bead wires located on the said building fabric, means for moving the gripping members and diaphragm supporting members together and apart and means for inflating the diaphragm.

2. Apparatus according to claim 1 wherein the bead wire gripping members each comprise an annular support within said diaphragm provided around its outer periphery with a recess, an inflatable annular tube within the recess, means for inflating the tube, and a plurality of arcuate segments surrounding the tube and forming an annulus within the recess, said segments each having a groove on their radially outermost surface, the grooves together forming a single substantially annular groove, the said annulus being expansible by inflation of the tube.

3. Apparatus according to claim 1 wherein the bead wire gripping members each comprise an annular support provided around its outer periphery with a recess, an inflatable annular tube within the recess, and an expansible rubber ring surrounding the tube and located within the recess, said ring having a groove extending circumferentially around its outer periphery and the ring being expansible by inflation of the tube.

4. Apparatus according to claim 1, comprising rigid annular members fixed one to each of the diaphragm supporting members said members having axially inwardly extending and radially outwardly flared surfaces extending over the diaphragm for deflecting the side portions of the diaphragm axially inwardly during the turning over of tyre building fabric around the bead wires.

5. Apparatus according to claim 1 wherein the diaphragm supporting members are axially slidably mounted in spaced-apart relationship on a supporting shaft and wherein the means for moving the supporting members together and apart comprises a cylindrical member disposed with its longitudinal axis parallel to the supporting shaft and having left- and right-handed screw-threaded portions one at each end in engagement with complementarily screw-threaded members, the cylindrical member being fixed axially but rotatable about its longitudinal axis, the complementarily screw-threaded members being connected one to each supporting member, and means for rotating the cylindrical member in one direction or the other so as to move the supporting members together or apart.

6. Apparatus according to claim 5 wherein the bead wire gripping members comprise two annular supports axially slidably mounted in spaced-apart relationship on the supporting shaft, and wherein the means for moving the supports together and apart comprises left- and right-handed screw-threaded portions one on each support in engagement with complementarily screw-threaded portions of the cylindrical member, the pitch of the screw-threads provided on the cylindrical member for moving the supports being smaller than the pitch of the screw-threads provided thereon for the supporting members whereby upon rotation of the cylindrical member the supporting members have a greater displacement than the supports for each rotation of the cylindrical member.

References Cited in the file of this patent

UNITED STATES PATENTS

| | | |
|---|---|---|
| 1,474,149 | Hopkinson | Nov. 13, 1923 |
| 1,551,040 | Marquette | Aug. 25, 1925 |
| 2,145,806 | Schnedarck | Jan. 31, 1939 |
| 2,251,904 | Breth | Aug. 12, 1941 |
| 2,614,951 | Iredell | Oct. 21, 1952 |